United States Patent
Kwon et al.

(10) Patent No.: US 10,014,526 B2
(45) Date of Patent: *Jul. 3, 2018

(54) ELECTRODE COMPOSITE, AND SECONDARY BATTERY AND CABLE TYPE SECONDARY BATTERY INCLUDING THE SAME

(71) Applicant: LG Chem, Ltd., Seoul (KR)

(72) Inventors: Yo-Han Kwon, Daejeon (KR); In-Sung Uhm, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 232 days.

This patent is subject to a terminal disclaimer.

(21) Appl. No.: 14/922,662

(22) Filed: Oct. 26, 2015

(65) Prior Publication Data

US 2016/0126555 A1 May 5, 2016

(30) Foreign Application Priority Data

Oct. 31, 2014 (KR) ........................ 10-2014-0150757

(51) Int. Cl.
*H01M 4/62* (2006.01)
*H01M 4/36* (2006.01)
*H01M 4/66* (2006.01)
*H01M 4/75* (2006.01)
*H01M 4/78* (2006.01)
*H01M 10/052* (2010.01)

(52) U.S. Cl.
CPC ........... *H01M 4/622* (2013.01); *H01M 4/366* (2013.01); *H01M 4/661* (2013.01); *H01M 4/668* (2013.01); *H01M 4/75* (2013.01); *H01M 4/78* (2013.01); *H01M 10/052* (2013.01)

(58) Field of Classification Search
CPC ...... H01M 4/622; H01M 4/366; H01M 4/661; H01M 4/668; H01M 4/75; H01M 4/78; H01M 10/052
See application file for complete search history.

(56) References Cited

U.S. PATENT DOCUMENTS

| | | | |
|---|---|---|---|
| 9,040,189 B2 * | 5/2015 | Kwon | H01M 10/0422 429/94 |
| 9,203,104 B2 * | 12/2015 | Kwon | H01M 4/0404 |
| 9,755,278 B2 * | 9/2017 | Kwon | H01M 10/0587 |
| 2001/0053475 A1 * | 12/2001 | Ying | H01M 2/16 429/137 |
| 2013/0143126 A1 | 6/2013 | Jung et al. | |
| 2014/0011065 A1 | 1/2014 | Kwon et al. | |

(Continued)

FOREIGN PATENT DOCUMENTS

| | | |
|---|---|---|
| JP | 09-007636 | 1/1997 |
| JP | H11354111 A | 12/1999 |

(Continued)

*Primary Examiner* — Gregg Cantelmo
(74) *Attorney, Agent, or Firm* — Lerner, David, Littenberg, Krumholz & Mentlik, LLP

(57) ABSTRACT

Provided is a sheet type separation layer-electrode composite including a current collector, an electrode active material layer formed on one surface of the current collector, and a porous first support layer formed on an upper surface of the electrode active material layer, and a secondary battery and a cable type secondary battery including the same.

21 Claims, 6 Drawing Sheets

(56) References Cited

U.S. PATENT DOCUMENTS

| | | | | |
|---|---|---|---|---|
| 2014/0377610 A1* | 12/2014 | Kwon | ............... | H01M 10/0422 429/94 |
| 2014/0377613 A1* | 12/2014 | Kwon | ............... | H01M 10/0565 429/94 |
| 2014/0377614 A1* | 12/2014 | Kwon | ............... | H01M 10/0565 429/94 |
| 2014/0377615 A1* | 12/2014 | Kwon | ............... | H01M 10/0565 429/94 |
| 2014/0377616 A1* | 12/2014 | Kwon | ............... | H01M 10/0565 429/94 |
| 2016/0079630 A1* | 3/2016 | Kwon | ............... | H01M 10/0422 429/94 |

FOREIGN PATENT DOCUMENTS

| | | |
|---|---|---|
| JP | 2014-035886 A | 2/2014 |
| KR | 20080010166 A | 1/2008 |
| KR | 20110121690 A | 11/2011 |
| KR | 20120014542 A | 2/2012 |
| KR | 20120098239 A | 9/2012 |
| KR | 20130045219 A | 5/2013 |
| KR | 10-1367975 B1 | 3/2014 |
| KR | 20140070751 A | 6/2014 |

* cited by examiner

US 10,014,526 B2

ELECTRODE COMPOSITE, AND SECONDARY BATTERY AND CABLE TYPE SECONDARY BATTERY INCLUDING THE SAME

TECHNICAL FIELD

The present disclosure relates to an electrode composite, and a secondary battery and a cable type secondary battery including the same.

The present application claims the benefit of Korean Patent Application No. 10-2014-0150757 filed on Oct. 31, 2014 with the Korean Intellectual Property Office, the disclosure of which is incorporated herein by reference in its entirety.

BACKGROUND ART

A secondary battery is a device that stores electrical energy in chemical form and converts the stored chemical energy into electrical energy to generate electricity when needed. The secondary battery is also referred to as a rechargeable battery because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

A secondary battery is currently used in applications requiring low electric power, for example, equipment to start a vehicle, a mobile device, a tool, and an uninterruptible power supply. Recently, as the development of wireless communication technology has been leading to the popularization of mobile devices and even to the mobilization of many types of existing devices, the demand for a secondary battery has been dramatically increasing. A secondary battery is also used in an environmentally friendly next-generation vehicle such as a hybrid vehicle or an electric vehicle to reduce the cost and weight and to increase the service life of the vehicle.

Generally, most secondary batteries have a cylindrical, prismatic, or pouch shape. This is associated with a fabrication process of a secondary battery that mounts an electrode assembly composed of a negative electrode, a positive electrode, and a separator in a cylindrical or prismatic metal can or a pouch-shaped case of an aluminum laminate sheet, and injects an electrolyte into the electrode assembly. Because a predetermined mounting space for the secondary battery is necessary in this process, the cylindrical, prismatic or pouch shape of the secondary battery is a limitation in developing various shapes of mobile devices. Accordingly, there is a need for a new type of secondary battery that is easily adaptable in shape.

In keeping with the need, suggestions have been made to develop a cable type secondary battery having a very high ratio of length to cross-sectional diameter. A cable type secondary battery may have a capacity reduction and deterioration in cycle life characteristics when a separation phenomenon of an electrode active material layer occurs due to stress caused by an external force in the event of deformation or rapid volume expansion of the electrode active material layer during charge/discharge.

To solve the problem, the binder content in the electrode active material layer increases and flexibility against bending or distortion will be provided. However, an increase in binder content in the electrode active material layer increases the electrode resistance, causing battery performance degradation. Further, if an external force strong enough to completely fold an electrode is applied, even though the binder content is increased, the separation of the electrode active material layer cannot be prevented, so this method does not present a proper solution.

DISCLOSURE

Technical Problem

The present disclosure is directed to providing an electrode composite that may impede cracks in an electrode active material layer in spite of an external force applied to the electrode active material layer, and may prevent the separation from a current collector even if the cracking is serious, and a secondary battery and a cable type secondary battery including the same.

Further, the present disclosure is directed to providing an electrode composite with no need to separately include a separation layer included in a traditional secondary battery, to provide a secondary battery and a cable type secondary battery with an increased energy density per volume and enhanced flexibility.

Technical Solution

To achieve the above objects, the present disclosure provides a sheet type separation layer-electrode composite including a current collector, an electrode active material layer formed on one surface of the current collector, and a porous first support layer formed on an upper surface of the electrode active material layer.

According to a preferred embodiment of the present disclosure, the first support layer may be a mesh type porous membrane or a nonwoven fabric.

According to another preferred embodiment of the present disclosure, the sheet type separation layer-electrode composite may further include a conductive coating layer containing a conductive material and a binder on the first support layer in the separation layer-electrode composite, and according to an embodiment of the conductive coating layer, the conductive material and the binder may be mixed at a weight ratio of from 80:20 to 99:1.

According to another preferred embodiment of the present disclosure, the sheet type separation layer-electrode composite may further include an organic-inorganic porous coating layer formed of a mixture of inorganic particles and a binder polymer on the first support layer in the separation layer-electrode composite.

According to another preferred embodiment of the present disclosure, the sheet type separation layer-electrode composite may further include a second support layer form on the other surface of the current collector, and according to an embodiment of the second support layer, it may be a polymer film.

According to another preferred embodiment of the present disclosure, four side surfaces corresponding to a height part of the sheet may be enclosed by a polymer causing no electrochemical reaction, and according to an embodiment of the polymer causing no electrochemical reaction, it may be at least one selected from the group consisting of PVdF, PVdF-HFP, polyacrylate, polyamide, polyimide, PE, and PP.

According to another preferred embodiment of the present disclosure, the current collector may be made of stainless steel, aluminum, nickel, titanium, baked carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste including metal powder of Ni, Al, Au, Ag, Pd/Ag, Cr, Ta, Cu, Ba or ITO; or a carbon paste including carbon powder of graphite, carbon black or carbon nanotubes.

According to another preferred embodiment of the present disclosure, the current collector may be a mesh type current collector.

According to another preferred embodiment of the present disclosure, the current collector may further include a primer coating layer containing a conductive material and a binder.

According to another preferred embodiment of the present disclosure, at least one surface of the current collector may have a plurality of recesses.

According to another preferred embodiment of the present disclosure, where an electrode of the sheet type separation layer-electrode composite is a negative electrode, the electrode active material layer may include particles of any one active material selected from the group consisting of natural graphite, artificial graphite, or carbonaceous materials; lithium-containing titanium composite oxide (LTO), and metals (Me) such as Si, Sn, Li, Zn, Mg, Cd, Ce, Ni, or Fe; alloys of the metals (Me); oxides (MeOx) of the metals (Me); and composites of the metals (Me) and carbon, or mixtures thereof, and where an electrode of the sheet type separation layer-electrode composite is a positive electrode, the electrode active material layer may include particles of any one active material selected from the group consisting of $LiCoO_2$, $LiNiO_2$, $LiMn_2O_4$, $LiCoPO_4$, $LiFePO_4$, $LiNiMn$-$CoO_2$ and $LiNi_{1-x-y-z}Co_xM1_yM2_zO_2$ (where each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which $0 \leq x < 0.5$, $0 \leq y < 0.5$, $0 \leq z < 0.5$, $x+y+z \leq 1$), or mixtures thereof.

According to another aspect of the present disclosure, the present disclosure provides a secondary battery including a positive electrode, a negative electrode, and an electrolyte, wherein at least one of the positive electrode and the negative electrode is a sheet type separation layer-electrode composite according to the present disclosure.

According to a preferred embodiment of the present disclosure, the secondary battery may be a stack type secondary battery, a wound secondary battery, a stack/folding secondary battery, or a cable type secondary battery.

According to still another aspect of the present disclosure, the present disclosure provides a cable type secondary battery including an inner electrode, and a sheet type separation layer-electrode composite according to the present disclosure as an outer electrode composite, the sheet type separation layer-electrode composite spirally wound to surround an outer surface of the inner electrode.

According to a preferred embodiment of the present disclosure, the sheet type separation layer-electrode composite may have a strip structure extending in one direction.

According to another preferred embodiment of the present disclosure, the sheet type separation layer-electrode composite may be spirally wound in non-overlapping turns, and according to a more specific embodiment, the sheet type separation layer-electrode composite may be spirally wound in non-overlapping turns, each turn spaced apart with a gap that is twice or less as large as a width of the sheet type separation layer-electrode composite.

According to another preferred embodiment of the present disclosure, the sheet type separation layer-electrode composite may be spirally wound in overlapping turns, and according to a more specific embodiment, the sheet type separation layer-electrode composite may be spirally wound such that a width of an overlapping part is 0.9 times or less as large as a width of the sheet type separation layer-electrode composite.

According to another preferred embodiment of the present disclosure, the inner electrode may be a negative electrode or a positive electrode, and an outer electrode in the outer electrode composite may be a positive electrode or a negative electrode opposing the inner electrode.

According to another preferred embodiment of the present disclosure, the cable type secondary battery may further include a protective coating formed to surround an outer surface of the outer electrode composite.

Advantageous Effects

According to the present disclosure, flexibility may be greatly enhanced by introducing a support layer on at least one surface of a sheet type electrode. Also, when an external force strong enough to completely fold an electrode is applied, even though the binder content in an electrode active material layer is not increased, the support layer serves as a buffer, thereby impeding cracks in the electrode active material layer, and consequently preventing the separation of the electrode active material layer from a current collector. Thereby, a reduction in battery capacity may be prevented and cycle life characteristics of a battery may be improved. Further, the porous support layer provided may allow an electrolyte solution to smoothly flow into the electrode active material layer, and infiltration of the electrolyte solution into the pores of the porous support layer may prevent a resistance increase in the battery and battery performance degradation.

Also, because an electrode composite according to the present disclosure does not necessarily need a separation layer in a secondary battery including the same, an energy density per volume may be increased and flexibility may be enhanced.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION FOR PRACTICING THE INVENTION

Figure 1:
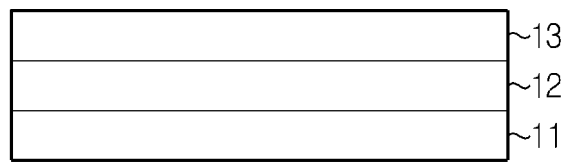
FIG. 1 is a diagram showing a cross section of a sheet type separation layer-electrode composite according to an embodiment of the present disclosure.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure relates to a sheet type separation layer-electrode composite including a current collector, an electrode active material layer formed on one surface of the current collector, and a porous first support layer formed on an upper surface of the electrode active material layer.

To fabricate a flexible battery, it is necessary to ensure sufficient flexible of an electrode. However, a traditional cable type secondary battery as one example of a flexible battery has a capacity reduction and deterioration in cycle life characteristics when a separation phenomenon of an electrode active material layer occurs due to stress caused by an external force in the event of deformation or rapid volume expansion of the electrode active material layer during charge/discharge in the case where a high capacity negative electrode active material such as Si and Sn based materials is applied. To overcome the problem, the binder content in the electrode active material layer increases and flexibility against bending or distortion will be provided.

However, an increase in binder content in the electrode active material layer increases the electrode resistance, causing battery performance degradation. Further, if an external force strong enough to completely fold an electrode is applied, even though the binder content is increased, the separation of the electrode active material layer cannot be prevented, so this method does not present a proper solution.

In this circumstance, the present disclosure solved the problem by including a porous first support layer formed on an upper surface of an electrode active material layer, and further including a second support layer formed on the other surface of a current collector.

The separation layer-electrode composite according to the present disclosure is a combination of an element acting as a separation layer to prevent a short circuit between electrodes and an element acting as an electrode, and with the use of the separation layer-electrode composite according to the present disclosure, a role of a battery may be sufficiently carried out even if a separation layer conventionally interposed between two electrodes is not included. That is, a secondary battery or a cable type battery including the separation layer-electrode composite according to the present disclosure may include a separation layer interposed between the electrode and the separation layer-electrode composite, but without a separation layer, a short circuit between electrodes may be prevented through the separation layer-electrode composite.

The separation layer-electrode composite is of sheet type. If a wire type is used, in the case of a wire type, because an electrode active material layer is formed by dip coating, the shape is maintained by a protective coating under external bending/distortion conditions, but nevertheless, there is a likelihood that cracks may be generated on the surface of an outer electrode active material layer, which is unfavorable in terms of electrode flexibility, so the present disclosure introduced a sheet type separation layer-electrode composite.

FIGS. 1 through 5 are schematic cross sectional views showing the cross section of the sheet type separation layer-electrode composite.

As shown in FIG. 1, the electrode may include a current collector 11, an electrode active material layer 12 formed on one surface of the current collector, and a porous first support layer 13 formed on an upper surface of the electrode active material layer 12, and when an external force such as bending or distortion is applied to the electrode, the porous first support layer 13 serves as a buffer to mitigate the external force applied to the electrode active material layer 12, thereby preventing the separation of the electrode active material layer 12, and enhancing the flexibility of the electrode. Also, due to having a porous structure, the first support layer allows an electrolyte solution to smoothly flow into the electrode active material layer, and the first support layer per se can be highly infiltrated with an electrolyte solution, ensuring ionic conductivity, so the first support layer prevents a resistance increase in the battery and battery performance degradation.

Figure 2:
FIG. 2 is a diagram showing a cross section of a sheet type separation layer-electrode composite according to another embodiment of the present disclosure.

As shown in FIG. 2, a second support layer 14 additionally formed may prevent a short circuit in the current collector 11 and further enhance the flexibility of the current collector 11.

Figure 3:
FIG. 3 is a diagram showing a cross section of a sheet type separation layer-electrode composite according to still another embodiment of the present disclosure.
Figure 4:
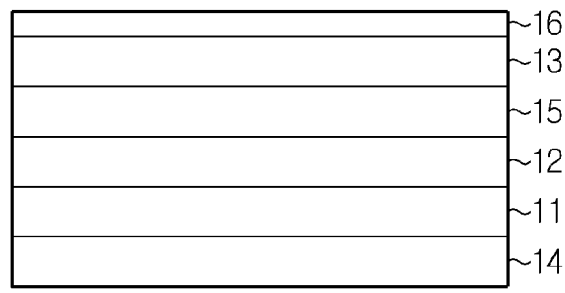
FIG. 4 is a diagram showing a cross section of a sheet type separation layer-electrode composite according to yet another embodiment of the present disclosure.

As shown in FIG. 3, additionally, a conductive coating layer 15 containing a conductive material and a binder may be further included between the first support layer 13 and the electrode active material layer 12 to improve conductivity of the electrode active material layer and reduce the electrode resistance, and as a consequence, prevent the battery performance degradation, and as shown in FIG. 4, on the first support layer 13, an organic-inorganic porous coating layer 16 formed of a mixture of inorganic particles and a binder polymer may be further included.

In the organic-inorganic porous coating layer 16 formed of a mixture of inorganic particles and a binder polymer, the polymer binder allows the adhesion of the inorganic particles so that the inorganic particles can be bound with each other (i.e., the polymer binder connects and immobilizes the inorganic particles therebetween), and the porous coating layer maintains a bound state with the first support layer by the polymer binder. The inorganic particles in the porous coating layer are substantially present in contact with each other to form a closest packed structure, and interstitial volumes created between the inorganic particles in contact become the pores of the porous coating layer.

The inorganic particles and the binder polymer in the organic-inorganic porous coating layer may be mixed at a weight ratio of 20:80 to 95:5.

In this instance, the inorganic particles in the organic-inorganic porous coating layer may be inorganic particles having a dielectric constant higher than or equal to 5, inorganic particles having the ability to transport lithium ions, or mixtures thereof. Here, the inorganic particles having a dielectric constant higher than or equal to 5 may be any one selected from the group consisting of $BaTiO_3$, $Pb(Zr_x, Ti_{1-x})O_3$(PZT, $0<x<1$), $Pb_{1-x}La_xZr_{1-y}Ti_yO_3$(PLZT, $0<x<1, 0<y<1$), $(1-x)Pb(Mg_{1/3}Nb_{2/3})O_3-xPbTiO_3$(PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$ and $TiO_2$, or mixtures thereof. The inorganic particles having the ability to transport lithium ions may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z, 0<x<3, 0<y<2, 0<z<4)$ based glass and $P_2S_5(Li_xP_yS_z, 0<x<3, 0<y<3, 0<z<7)$ based glass, or mixtures thereof.

The inorganic particles in the organic-inorganic porous coating layer may have an average particle diameter of from 10 nm to 5 μm.

The binder polymer in the organic-inorganic porous coating layer may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures, but is not limited thereto.

Figure 5:
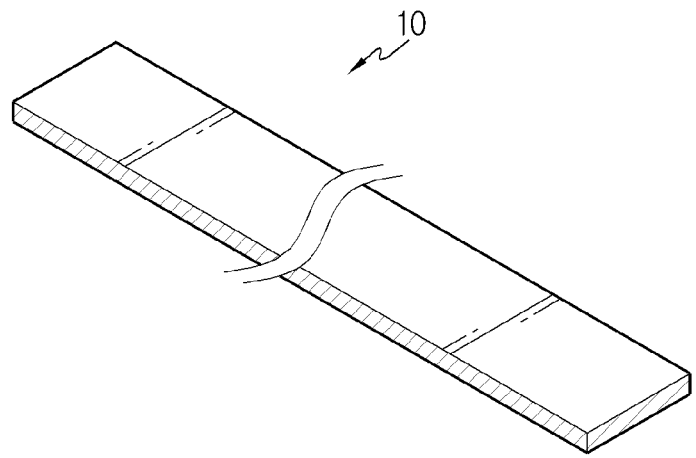
FIG. 5 is a diagram showing a separation layer-electrode composite according to an embodiment of the present disclosure with hatched side surfaces corresponding to the height.

Preferably, the separation layer-electrode composite according to the present disclosure may be further enclosed by a polymer layer causing no electrochemical reaction around the four side surfaces corresponding to the height of the sheet of the sheet type separation layer-electrode composite as hatched in FIG. 5 (two front surfaces shown hatched and two rear surfaces not shown). The polymer layer is a capsulated form of the four surfaces corresponding to the height of the sheet type separation layer-outer electrode composite, and covers a current collector layer that may be exposed through the surfaces corresponding to the height of the sheet with an insulating material to prevent an internal short. The polymer causing no electrochemical reaction includes, but is not limited to, PVdF, PVdF-HFP, polyacrylate, polyamide, polyimide, PE, and PP.

According to a method of manufacturing a sheet type separation layer-electrode composite according to a first embodiment, first, an electrode active material slurry is applied to one surface of a current collector (S1).

Here, the current collector serves to collect electrons generated by an electrochemical reaction of an electrode active material or to supply electrons required for an electrochemical reaction, and may be made from stainless steel, aluminum, nickel, titanium, baked carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste including metal powder of Ni, Al, Au, Ag, Pd/Ag, Cr, Ta, Cu, Ba or ITO; or a carbon paste including carbon powder of graphite, carbon black or carbon nanotubes.

When an external force such as bending or distortion is applied to a secondary battery as described above, the electrode active material layer may separate from the current collector. Thus, for the benefit of electrode flexibility, a large amount of binder components are added to the electrode active material layer. However, the binder in large amounts swells in an electrolyte solution and is apt to separate from the current collector, causing battery performance degradation.

To improve the adhesion between the electrode active material layer and the current collector, the current collector may further include a primer coating layer containing a conductive material and a binder. In this instance, the conductive material and the binder may be the same type as that used to form a conductive coating layer as described below.

Figure 6:
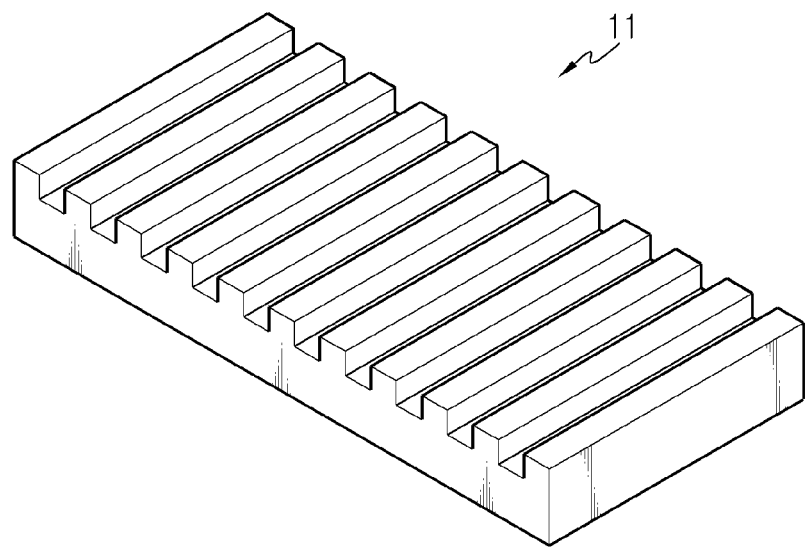
FIG. 6 is a schematic diagram showing a surface of a current collector having a plurality of recesses according to an embodiment of the present disclosure.
Figure 7:
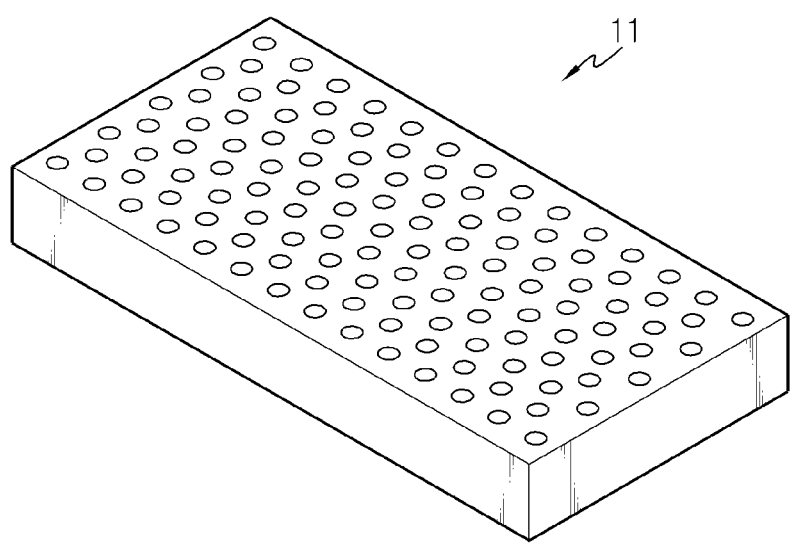
FIG. 7 is a schematic diagram showing a surface of a current collector having a plurality of recesses according to another embodiment of the present disclosure.

The current collector may be a mesh type current collector, and to further increase the surface area of the current collector, a plurality of recesses may be formed on at least one surface, as shown in FIG. 6 or 7. In this instance, the plurality of recesses may have a continuous pattern or an intermittent pattern. That is, a continuous pattern of recesses arranged in the lengthwise direction, spaced apart from each other, may be formed, or an intermittent pattern of multiple holes may be formed. The plurality of holes may be circular or polygonal in shape.

Subsequently, a porous first support layer is formed on the applied electrode active material slurry (S2).

Here, the first support layer may be a mesh type porous membrane or a nonwoven fabric. The first support layer may be formed of any one selected from the group consisting of high density polyethylene, low density polyethylene, linear low density polyethylene, ultra high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

In this instance, a conductive coating layer containing a conductive material and a binder may be further included between the first support layer and the electrode active material layer. The conductive coating layer improves conductivity of the electrode active material layer and reduces the electrode resistance, and as a consequence, prevents the battery performance degradation.

For a negative electrode, because conductivity of a negative electrode active material layer is relatively high, a negative electrode with no conductive coating layer shows similar performance to the case where a general negative electrode is used, while for a positive electrode, because conductivity of a positive electrode active material layer is low, performance degradation caused by an increase in the electrode resistance may become more serious, so it is specially advantageous when applied to a positive electrode with an aim of resistance reduction in the battery.

In this instance, the conductive coating layer may include a mixture of the conductive material and the binder at a weight ratio of from 80:20 to 99:1. When the binder content increases, the electrode resistance may excessively increase, but when the content satisfies the above numerical range, an excessive increase in the electrode resistance is prevented.

Further, because the first support layer serves as a buffer to prevent the separation of the electrode active material layer as described above, even a comparatively small amount of binders does not have great difficulties in ensuring the flexibility of the electrode.

In this instance, the conductive material may include, but is not limited to, any one selected from the group consisting of carbon black, acetylene black, ketjen black, carbon fiber, carbon nanotubes and graphene, or mixtures thereof.

The binder may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof, but is not limited thereto.

Subsequently, a resulting product of the step (S2) is compressed to form an electrode active material layer adhered and incorporated between the current collector and the first support layer (S3). When coating the electrode active material slurry on one surface of the current collector and drying to form an electrode active material layer, and forming a first support layer thereon via lamination, as the binder component in the electrode active material slurry used for the adhesion between the electrode active material layer and the first support layer is cured, a strong adhesive strength between the two layers may not be maintained.

Without using the pre-manufactured porous first support layer as in the manufacturing method, a porous support layer may be formed by coating a polymer solution on the electrode active material layer. However, the porous support formed by coating the polymer solution has poor mechanical properties as compared to the porous first support layer manufactured by the preferred manufacturing method of the present disclosure, so it cannot effectively prevent the separation of the electrode active material layer caused by an external force.

However, according to the preferred manufacturing method of the present disclosure, because the first support layer is formed on the upper surface of the applied electrode active material slurry before the binder component is cured, an electrode active material layer adhered and incorporated between the current collector and the first support layer may be formed by coating together through coating blades.

Before the step (S1) or after the step (S3), the manufacturing method may further include the step for forming a second support layer on the other surface of the current collector via compression. Here, the second support layer may prevent a short circuit in the current collector and further improve the flexibility of the current collector.

In this instance, the second support layer may be a polymer film, and here, the polymer film may be formed of any one selected from the group consisting of polyolefin, polyester, polyimide and polyamide, or mixtures thereof.

Where an electrode of the sheet type separation layer-electrode composite is a negative electrode, the electrode active material layer includes particles of any one active material selected from the group consisting of natural graphite, artificial graphite, or carbonaceous materials; lithium-containing titanium composite oxide (LTO), and metals (Me) such as Si, Sn, Li, Zn, Mg, Cd, Ce, Ni, or Fe; alloys of the metals (Me); oxides (MeOx) of the metals (Me); and composites of the metals (Me) and carbon, or mixtures thereof, and where an electrode of the sheet type separation layer-electrode composite is a positive electrode, the electrode active material layer may include particles of any one active material selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (where each of M1 and M2 is, independently, any one selected from the group consisting of Al, Ni, Co, Fe, Mn, V, Cr, Ti, W, Ta, Mg and Mo, and x, y and z are, independently, atomic fractions of elements in an oxide composition, in which $0 \leq x < 0.5$, $0 \leq y < 0.5$, $0 \leq z < 0.5$, $x+y+z \leq 1$), or mixtures thereof.

On the other hand, the present disclosure provides a secondary battery including a positive electrode, a negative electrode, and an electrolyte, wherein at least one of the positive electrode and the negative electrode is a sheet type separation layer-electrode composite according to the present disclosure. As previously described, the secondary battery including the sheet type separation layer-electrode composite according to the present disclosure may sufficiently exhibit the battery performance even if a separation layer conventionally interposed between the positive electrode and the negative electrode is not included.

Here, the secondary battery of the present disclosure may be a general type of secondary battery including a stack type secondary battery, a wound secondary battery, and a stack/folding secondary battery, as well as a special type of secondary battery including a cable type secondary battery.

On the other hand, a cable type secondary battery according to the present disclosure includes an inner electrode; and a sheet type separation layer-electrode composite according to the present disclosure spirally wound to surround an outer surface of the inner electrode. As previously described, the cable type battery may sufficiently exhibit the battery performance even if a separation layer conventionally interposed between the inner electrode and the outer electrode is not included.

Here, the term spiral, also known as a helix, refers to a curve that turns in a twisting shape within a predetermined range, and collectively represents shapes similar to the shape of a general spring.

The separation layer-electrode composite may have a strip (band) structure extending in one direction.

The separation layer-electrode composite may be spirally wound in non-overlapping turns. In this instance, the separation layer-electrode composite may be spirally wound in non-overlapping turns, each turn spaced apart with a gap that is twice or less as large as the width of the separation layer-electrode composite, to prevent the battery performance from degrading.

Also, the separation layer-electrode composite may be spirally wound in overlapping turns. In this instance, to prevent an excessive increase in the internal resistance of the battery, the separation layer-electrode composite may be spirally wound such that the width of an overlapping part is 0.9 times or less as large as the width of the separation layer-electrode composite.

The inner electrode includes an inner current collector and an inner electrode active material layer.

In relation to the shape of the inner electrode, according to an embodiment, the inner electrode may have a hollow structure in which a space is formed inside, and according to another embodiment, the inner electrode may have a parallel arrangement structure or a twisted arrangement structure in close contact so that there is no space formed inside.

At least one inner electrode with the above structure may be provided, and according to an embodiment, a plurality of inner electrodes may be arranged in parallel.

Figure 8:
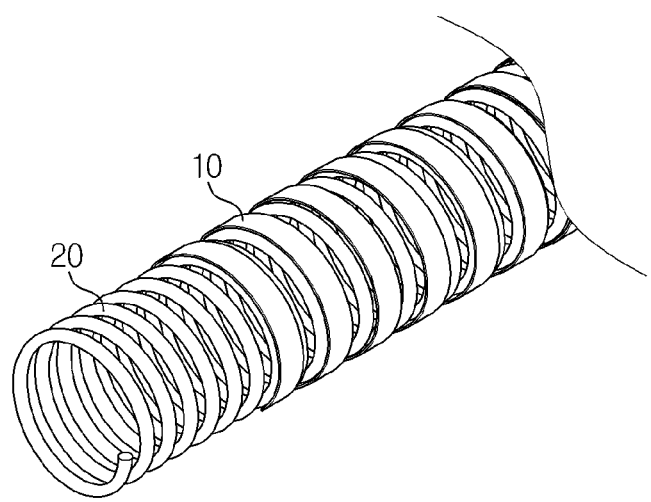
FIG. 8 is a schematic exploded perspective view showing an electrode assembly having an internal electrode with a hollow structure according to an embodiment of the present disclosure.
Figure 9:
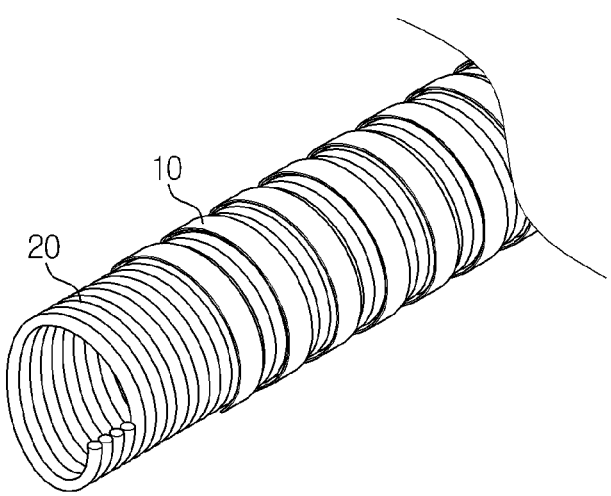
FIG. 9 is a schematic exploded perspective view showing an electrode assembly having an internal electrode with a hollow structure according to another embodiment of the present disclosure.

More specifically, the hollow structure may be at least one wire type inner electrode spirally wound as shown in FIG. 8, or at least two wire type inner electrodes spirally wound cross over each other as shown in FIG. 9.

More specifically describing the hollow structure, in the space formed in the inner electrode, an inner electrode current collector core may be formed. In this instance, the inner electrode current collector core may be made of carbon nanotubes, stainless steel, aluminum, nickel, titanium, baked carbon, or copper; stainless steel treated with carbon, nickel, titanium or silver on the surface thereof; an aluminum-cadmium alloy; a non-conductive polymer treated with a conductive material on the surface thereof; or a conductive polymer.

Also, in the space formed in the inner electrode, a lithium ion supplying core containing an electrolyte may be formed. In this instance, the lithium ion supplying core may include a gel type polymer electrolyte and a support. Also, the lithium ion supplying core may include a liquid electrolyte and a porous carrier.

Furthermore, in the space formed in the inner electrode, a filling core may be formed. In addition to materials for forming the inner electrode current collector core and the lithium ion supplying core as described above, the filling core may be formed of materials for improving various performance of the cable type secondary battery, for example, polymer resins, rubbers, and inorganic materials in various shapes such as a wire, a fiber, powder, a mesh, and a foam.

FIGS. 8 and 9 are schematic diagrams showing an electrode assembly including an inner electrode and a separation layer-electrode composite according to the present disclosure, and the electrode assembly includes a hollow inner electrode 20 having a space formed inside, and a sheet type separation layer-outer electrode composite 10 spirally wound to surround an outer surface of the inner electrode 20.

The cable type secondary battery according to an embodiment of the present disclosure includes a lithium ion supplying core containing an electrolyte; an inner electrode formed to surround an outer surface of the lithium ion supplying core, and including a current collector and an electrode active material layer; a separation layer-electrode composite according to the present disclosure spirally wound to surround an outer surface of the inner electrode.

The cable type secondary battery according to an embodiment of the present disclosure has a horizontal cross section of a predetermined shape, and has a linear structure elongating in the lengthwise direction with regard to the horizontal cross section. The cable type secondary battery according to an embodiment of the present disclosure has flexibility and free shape adaptability. Here, the predetermined shape is not limited to a particular shape, and includes any shape so long as it does not spoil the essence of the present disclosure.

Figure 10:
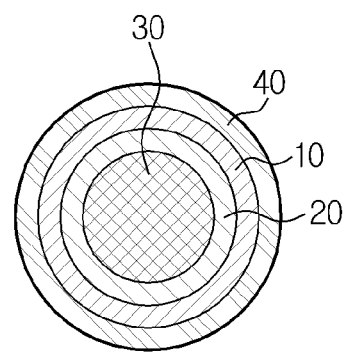
FIG. 10 is a cross sectional view showing a cross section of a cable type secondary battery according to an embodiment of the present disclosure.

In the cable type secondary battery, FIG. 10 shows a cross section of the cable type secondary battery in which an electrode for a secondary battery of the present disclosure as descried above is introduced to the inner electrode.

Referring to FIG. 10, the cable type secondary battery includes a lithium ion supplying core 30 containing an electrolyte; an inner electrode 20 wound to surround an outer surface of the lithium ion supplying core 30; and a separation layer-electrode composite 10 according to the present disclosure spirally wound to surround an outer surface of the inner electrode.

As mentioned above, an outer electrode, not the inner electrode, may be an electrode for a sheet type secondary battery of the present disclosure described above, and both the inner electrode and the outer electrode may include an electrode for a sheet type secondary battery of the present disclosure.

Here, the lithium ion supplying core 30 contains an electrolyte, and the electrolyte is not limited to a particular type and may include a nonaqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel type polymer electrolyte using PEO, PVdF, PVdF-HFP, PMMA, PAN or PVAc; or a solid electrolyte using PEO, PPO (polypropylene oxide), PEI (polyethylene imine), PES (polyethylene sulphide) or PVAc (polyvinyl acetate). The electrolyte may further include a lithium salt, and as the lithium salt, it is preferred to use LiCl, LiBr, LiI, LiClO$_4$, LiBF$_4$, LaB$_{10}$Cl$_{10}$, LiPF$_6$, LiCF$_3$SO$_3$, LiCF$_3$CO$_2$, LiASF$_6$, LiSbF$_6$, LiAlCl$_4$, CH$_3$SO$_3$Li, CF$_3$SO$_3$Li, (CF$_3$SO$_2$)$_2$ NLi, lithium chloroborate, lower aliphatic lithium carbonate, and lithium tetraphenylborate. The lithium ion supplying core 30 may consist only of an electrolyte, and a liquid electrolyte solution may be formed using a porous carrier.

The inner electrode may be a negative electrode or a positive electrode, and the outer electrode may be a positive electrode or a negative electrode opposing the inner electrode.

An electrode active material used for the negative electrode or the positive electrode is as described above.

Furthermore, the present disclosure has a protective coating 40, and the protective coating corresponds to an insulator and is formed on an outer surface of the electrode assembly to protect the electrodes from moisture in the air and external impacts. As the protective coating 40, an ordinary polymer resin including a moisture barrier layer may be used. In this instance, the moisture barrier layer may be made from aluminum or a liquid crystal polymer which is excellent in the moisture barrier performance, and the polymer resin may include PET, PVC, HDPE or epoxy resin.

On the other hand, a cable type secondary battery including at least two inner electrodes according to another aspect of the present disclosure includes at least two inner electrodes arranged in parallel to each other; and a separation layer-electrode composite according to the present disclosure spirally wound to surround outer surfaces of the inner electrodes.

Further, a cable type secondary battery including at least two inner electrodes according to still another aspect of the present disclosure includes at least two lithium ion supplying cores containing an electrolyte; at least two inner electrodes formed to surround an outer surface of each of the lithium ion supplying cores, including a current collector and an electrode active material layer, and arranged in parallel to each other; and a separation layer-electrode composite as an outer electrode composite, spirally wound to surround outer surfaces of the inner electrodes together. Because the cable type secondary battery has the inner electrodes composed of a plurality of electrodes, a loading amount of electrode active material layers and the battery capacity may be easily controlled by adjusting the number of inner electrodes, and the presence of the plurality of electrodes may prevent a potential short circuit.

Briefly describing a method of manufacturing the cable type secondary battery, a sheet type separation layer-electrode composite according to the present disclosure is spirally wound on an outer surface of an inner electrode to make an electrode assembly as shown in FIGS. 8 and 9, and a protective coating is formed to protect an outer surface of the electrode assembly. Subsequently, an electrolyte is injected into an empty space formed at the center of the inner electrode to form a lithium ion supplying core. As described above, the lithium ion supplying core may be formed by injecting an electrolyte solution after forming the protective coating on the outer surface of the electrode assembly, but the lithium ion supplying core may be formed by forming a polymer electrolyte in wire shape using an extruder before making the wound wire type inner electrode, or may be formed by preparing a wire type carrier of a sponge material and injecting a nonaqueous electrolyte solution therein. Alternatively, after the inner electrode is prepared, the lithium ion supplying core may be formed by injecting a nonaqueous electrolyte solution into an empty space at the center of the inner electrode. Subsequently, an electrolyte solution feeding part is completely sealed to fabricate a cable type secondary battery.

DESCRIPTION OF REFERENCE NUMERALS

10: separation layer-electrode composite
20: inner electrode
11: electrode current collector
12: electrode active material layer
13: first support layer
14: second support layer
15: conductive layer
16: organic-inorganic porous coating layer
30: lithium ion supplying core
40: protective coating

What is claimed is:
1. A cable secondary battery comprising:
an inner electrode; and
a sheet separation layer-electrode composite as an outer electrode composite, the sheet separation layer-electrode composite spirally wound to surround an outer surface of the inner electrode,
wherein the sheet separation layer-electrode composite comprises:
a current collector;
an electrode active material layer formed on one surface of the current collector; and
a porous first support layer formed on an upper surface of the electrode active material layer.
2. The cable secondary battery according to claim 1, wherein the sheet separation layer-electrode composite has a strip structure extending in one direction.
3. The cable secondary battery according to claim 1, wherein the sheet separation layer-electrode composite is spirally wound in non-overlapping turns.
4. The cable secondary battery according to claim 3, wherein the sheet separation layer-electrode composite is spirally wound in non-overlapping turns, each turn spaced apart with a gap that is twice or less as large as a width of the sheet separation layer-electrode composite.
5. The cable secondary battery according to claim 1, wherein the sheet separation layer-electrode composite is spirally wound in overlapping turns.
6. The cable secondary battery according to claim 5, wherein the sheet separation layer-electrode composite is spirally wound such that a width of an overlapping part is 0.9 times or less as large as a width of the sheet separation layer-electrode composite.
7. The cable secondary battery according to claim 1, wherein the inner electrode is a negative electrode or a positive electrode, and an outer electrode in the outer electrode composite is a positive electrode or a negative electrode opposing the inner electrode.
8. The cable secondary battery according to claim 1, further comprising:
a protective coating formed to surround an outer surface of the outer electrode composite.
9. The cable secondary battery according to claim 1, wherein the first support layer is a mesh porous membrane or a nonwoven fabric.
10. The cable secondary battery according to claim 1, further comprising:
a conductive coating layer including a conductive material and a binder between the first support layer and the electrode active material layer in the separation layer-electrode composite.
11. The cable secondary battery according to claim 10, wherein the conductive coating layer includes a mixture of the conductive material and the binder at a weight ratio of from 80:20 to 99:1.
12. The cable secondary battery according to claim 1, further comprising:
an organic-inorganic porous coating layer formed of a mixture of inorganic particles and a binder polymer on the first support layer in the separation layer-electrode composite.
13. The cable secondary battery according to claim 1, further comprising:
a second support layer form on the other surface of the current collector.
14. The cable secondary battery according to claim 13, wherein the second support layer is a polymer film.
15. The cable secondary battery according to claim 1, wherein four side surfaces corresponding to a height part of the sheet are enclosed by a polymer causing no electrochemical reaction.
16. The cable secondary battery according to claim 15, wherein the polymer causing no electrochemical reaction is PVdF, PVdF-HFP, Polyacrylate, Polyamide, Polyimide, PE, or PP.
17. The cable secondary battery according to claim 1, wherein the current collector is made of stainless steel, aluminum, nickel, titanium, baked carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste including metal powder of Ni, Al, Au, Ag, Pd/Ag, Cr, Ta, Cu, Ba or ITO; or a carbon paste including carbon powder of graphite, carbon black or carbon nanotubes.
18. The cable secondary battery according to claim 1, wherein the current collector is a mesh current collector.
19. The cable secondary battery according to claim 1, wherein the current collector further comprises a primer coating layer including a conductive material and a binder.
20. The cable secondary battery according to claim 1, wherein at least one surface of the current collector has a plurality of recesses.
21. The cable secondary battery according to claim 1, wherein an electrode of the sheet separation layer-electrode composite is a negative electrode, the electrode active material layer includes particles of natural graphite, artificial graphite, or carbonaceous materials; lithium-containing titanium composite oxide (LTO), metals (Me), Si, Sn, Li, Zn, Mg, Cd, Ce, Ni, Fe; alloys of the metals (Me); oxides (MeOx) of the metals (Me); composites of the metals (Me) and carbon, or mixtures thereof, or an electrode of the sheet separation layer-electrode composite is a positive electrode, the electrode active material layer includes particles of $LiCoO_2$, $LiNiO_2$, $LiMn_2O_4$, $LiCoPO_4$, $LiFePO_4$, $LiNiMnCoO_2$ or $LiNi_{1-x-y-z}Co_xM1_yM2_zO_2$ (where each of M1 and M2 is, independently, Al, Ni, Co, Fe, Mn, V, Cr, Ti, W, Ta, Mg or Mo, and x, y and z are, independently, atomic fractions of elements in an oxide composition, in which $0 \leq x < 0.5$, $0 \leq y < 0.5$, $0 \leq z < 0.5$, $x+y+z \leq 1$), or mixtures thereof.

* * * * *